United States Patent
Duffy

[15] 3,664,031
[45] May 23, 1972

[54] PORTABLE HEIGHT AND DEPTH SETTING GAUGE

[72] Inventor: Edward J. Duffy, Bernardsville, N.J. 07924

[22] Filed: Aug. 3, 1970

[21] Appl. No.: 60,595

[52] U.S. Cl..................................................33/185, 33/162
[51] Int. Cl............................................................B27g 23/00
[58] Field of Search.............................................33/185, 162

[56] References Cited

UNITED STATES PATENTS 2,219,180   10/1940   Fichter.....................................33/162

Primary Examiner—Leonard Forman
Assistant Examiner—Paul G. Feldes
Attorney—Henry J. Walsh

[57] ABSTRACT

A gauge having two direct reading scales and comprising a triangular framework and gauge head slidably mounted thereon is disclosed. The head includes two sideward extending members, both of which can be moved to a so called setting position by sliding the head along an inclined surface of the framework. A pointer extends from the head for indicating on the appropriate scale, directly, the distance between a reference surface and tool surfaces coming into contact with either member. An arrangement for clamping the head in the setting position as well as an arrangement for calibrating scales and for adjusting for parts wear is included.

7 Claims, 3 Drawing Figures

Patented May 23, 1972

INVENTOR
EDWARD J. DUFFY
BY Henry J. Walsh
ATTORNEY

Patented May 23, 1972

INVENTOR
EDWARD J. DUFFY
BY
Henry J. Walsh
ATTORNEY

PORTABLE HEIGHT AND DEPTH SETTING GAUGE

BACKGROUND OF THE INVENTION

This invention relates to an improvement in height and depth setting gauges which, for example, establish the height or depth of a projecting cutting portion of a table saw blade and of a drill bit with respect to a reference surface. More particularly, it refers to such gauges having built-in indicies indicating, directly, the height and depth.

Customarily table saws and drill presses have integrated height and depth indicating devices which are ordinarily coupled to the means for raising and lowering the saw and drill bit. These devices however fail to include facilities to compensate for table wear, changes in blade diameter, differences between actual cuts and tool projections and other variants which arise through usage. For example, the improper seating of a drill bit in the drill chuck cannot be facilely compensated for by these integrated devices.

To some extent these shortcomings have been met by a variety of portable gauges. The vast majority of these are designed to be used with precision ground blocks of varying heights which are stacked to obtain a desired measurement. The tool is then set to the precisely determined height (setting position) of the blocks and locked in position. Because these gauges must be used with precision blocks and do not include either direct reading scales or compensating adjustments, they are also known as measurement transfer gauges. This type of gauge has manifest disadvantages and is particularly time consuming to use where a consecutive series of varying height and depths must be accurately set.

Attempts have been made to furnish portable indicating gauges with built-in indicating scales such as that disclosed in U.S. Pat. No. 3,205,586 of Sept. 14, 1965 to O. K. Mullen. Those efforts have failed to produce a tool capable of maintaining a high degree of accuracy uniformly through the entire scale. In many instances the scale and pointer are difficult to read with accuracy. Also the provisions for recalibration necessary because of parts wear are either non-existent or inadequate. Moreover the cost of manufacturing these gauges with the high degree of accuracy necessary to insure built-in accuracy is prohibitive.

Accordingly, it is the object of my invention to provide a simply manufactured, portable, direct reading, easily used, gauge for measuring the displacement of tool surfaces from a reference surface as well as for setting a cutting tool to a desired depth or height of cut in a piece of work to a high degree of accuracy. It is a further object to furnish easily readable direct reading scales on my gauge as well as simple but efficient calibration arrangements to maintain the gauge accuracy during its useful life.

SUMMARY OF THE INVENTION

The foregoing objects and advantages will become readily apparent from a consideration of the details of construction and utilization of my invention, as more fully described and claimed hereinafter. The objects and advantages are attained in accordance with a preferred embodiment which may be generally described as comprising four essential items, i.e. a triangular framework including a scale, a gauge piece slidably mounted on a inclined surface of the framework, an indicating finger adjustably secured to the gauge piece, and an eccentric cam lever arrangement for locking the gauge piece to the framework.

An aspect of my invention is the utilization of the mechanical advantage inherent in a ramp type structure to furnish an "exploded" direct reading scale. The gauge piece has two outwardly extending contact surfaces either one of which contacts the tool surface to be measured or set. The ratio of the vertical displacement of each contact surface to the distance travelled along the framework ramp surface is dependent on the corner angles of the framework. Thus, it may be appreciated that the scales (two shown in this arrangement) are expanded to enhance the accuracy of my tool and the readability of each scale.

Another advantage of my gauge is the means for calibrating the scale initially and for compensating for wear subsequently of the gauge parts. The combination of parallel guides on the gauge piece and a slotted hole in the indicating finger permits the finger to be moved along the guides with respect to the gauge piece. Since the contact surfaces are an integral part of the gauge piece, adjustment of the finger in this manner calibrates both direct reading scales concurrently. Wear in the lever arrangement is easily corrected by repositioning an externally splined shaft which engages a lever arm having an internally splined hole.

Other advantages of my invention will be appreciated from a reading of the detailed description which depicts additional details of the eccentric cam lever arrangement for locking the gauge piece in a prescribed position as well as the accessibility of the contact surface for taking measurements and making settings.

DETAILED DESCRIPTION

Figure 1:
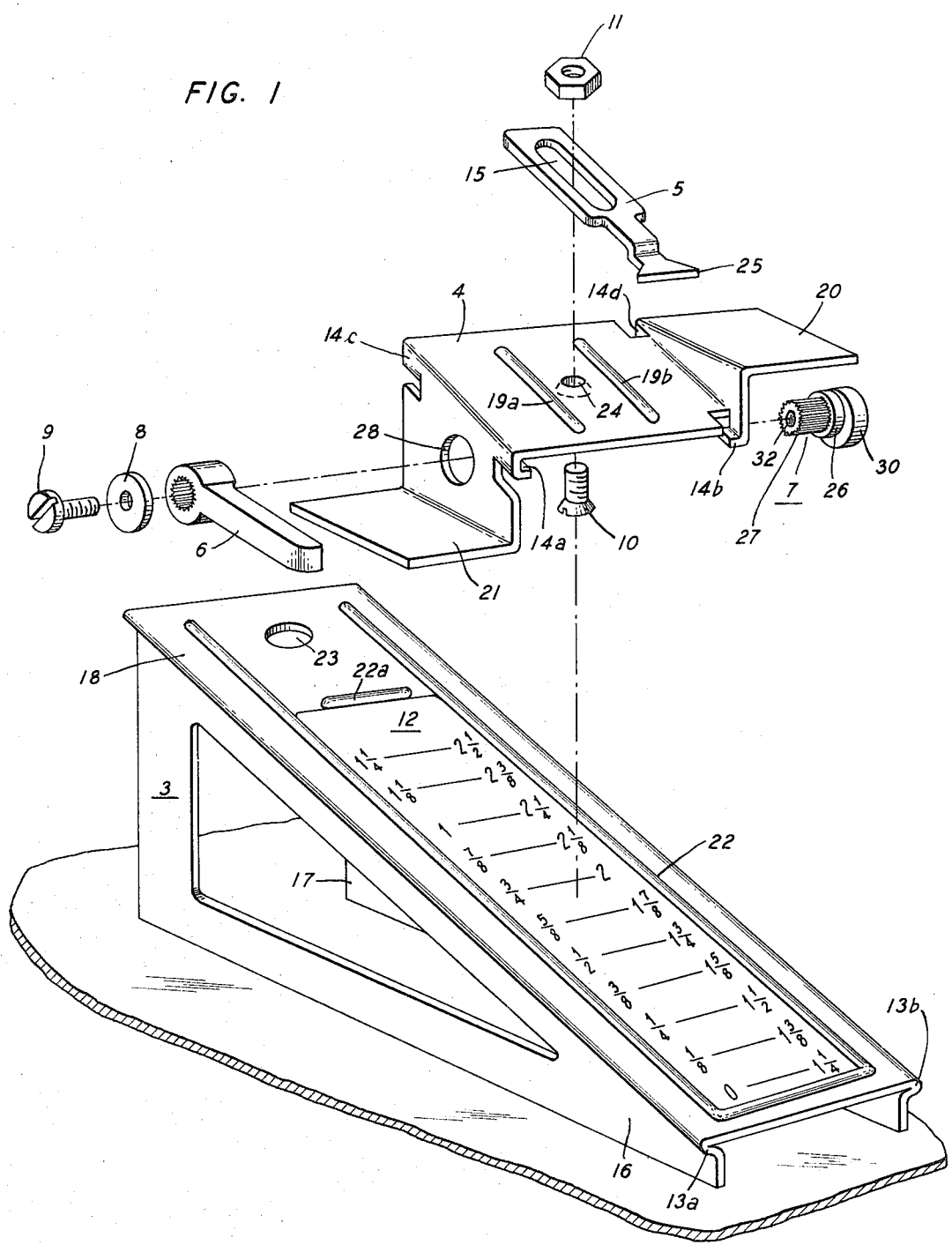
FIG. 1 depicts an exploded isometric projection showing the components of my gauge and assembly alignment.
Figure 2:
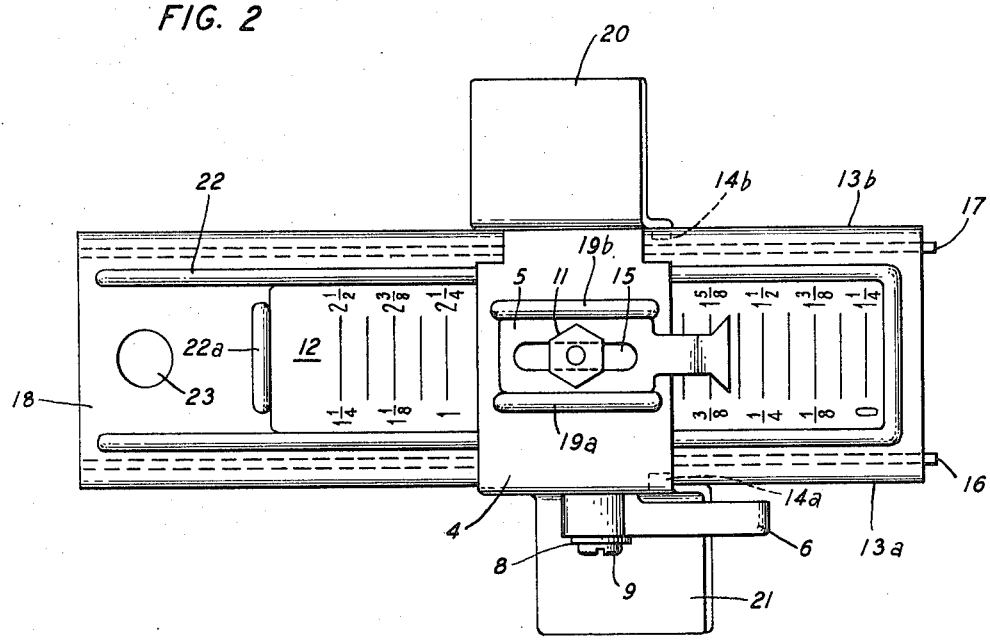
FIG. 2 depicts a view perpendicular to the included surface of my gauge as it appears fully assemblied.

With reference to FIGS. 1 and 2, the various components which compose my gauge will now be described. The major components are a triangular framework (or base) 3, slidable gauge head (or piece) 4, indicating finger 5, a (locking) lever 6, and eccentric locking cam 7. Considering framework 3 initially, it comprises a left side 16 and right side 17, both with triangular cut outs, as well as ramp (inclined) surface 18. Framework 3 may be shaped from cold rolled steel so as to produce the protruding corner details labeled slide guides 13a and 13b. Referring momentarily to gauge head 4, the slide grip fingers (tabs) 14a, 14b, 14c and 14d engage and embrace guides 13a and 13b to constrain the movement of head 4 to movement along inclined surface 18. In surface 18 there are upstanding ribs 22 and 22a. These serve a dual function. They frame an area in which self-adhering metalized indicating scale 12 is placed. The upper surfaces of rib 22 running the length of ramp surface 18 also serves as the bearing and sliding surfaces supporting gauge head 4.

Mounting hole 23 is positioned for utilization with customary hanging fixtures for storage of the gauge.

Turning next to slidable gauge head 4, it includes besides fingers 14a–14d which were previously discussed, two winglike surfaces which are termed gauge contact members 20 and 21. The upper and lower surfaces of members 20 and 21 come into contact with the tool surfaces to be measured. For example, when the depth of a drill hole must be ascertained the tip of the drill bit, in its fully extended position, contacts the top surface of either member 20 or 21. On the other hand, if the depth of cut of a table saw blade is measured, the gauge is positioned adjacent to the blade and the bottom surfaces of members 20 or 21 contact the blade edges. The height of member 20 above a reference surface (see FIG. 1) is indicated on the right hand scale (1¼–2¼) of indicating scale 12. The distance of member 21 above the reference surface is indicated on the left-hand scale (0–1¼).

Both scales are simultaneously calibrated when either scale is verified by actual measurement of the height of either contact surface above the reference surface and by locating finger 5 in accordance with the measured height or depth. Indicating finger 5 is secured to gauge head 4 with screw 10 and nut 11 through calibrating slot 15. Take note that indicating finger guides 19a and 19b which are raised surfaces restrain finger 5 so as to limit movement only within guides 19a and 19b. Pointer 25 is wide enough to insure clear reading of both scales simultaneously. Slot 15 permits the adjustment of pointer 25 to calibrate the gauge. This aspect is best seen in FIG. 2.

The locking arrangement to hold gauge head 4 at a prescribed position on ramp surface 18 comprises lever 6 and eccentric locking cam 7. The latter has four contiguous portions including externally splined extension 27, bearing shoulder 26, eccentric cam 30 and threaded hole 32. The arrangement is assembled by inserting eccentric cam 7 into hole 28 so that shoulder 26 contacts the sides of hole 28. Screw 9 passes through washer 8 clamp lever 6 and engages threaded hole 32 to clamp lever 6 against the side of shoulder 26. The length of shoulder 26 is adequate to provide axial clearance between side surfaces of lever 6 and cam 30 nearest head 4 for allowing freedom of axial motion. Splined engagement of lever 6 to locking cam 7 allows for convenient positioning of lever 6 on gauge 4 and also a means of adjusting for wear of the cam surfaces to insure positive locking. When assembled the extended outer circumferential surface of cam 30 contacts the underside outside surface of protruding guide 13a to hold head 4. Sufficient clearance is maintained between the inside vertical surface of head 4 contiguous to member 21 and the outer surface of left side surface 16 of framework 3 to permit cam 30 to rotate freely therebetween. Raising lever 6 turns cam 30 so as to break the contact with the outer rib underside surface of guide 13a and allow movement of head 4 along surface 18.

Figure 3:
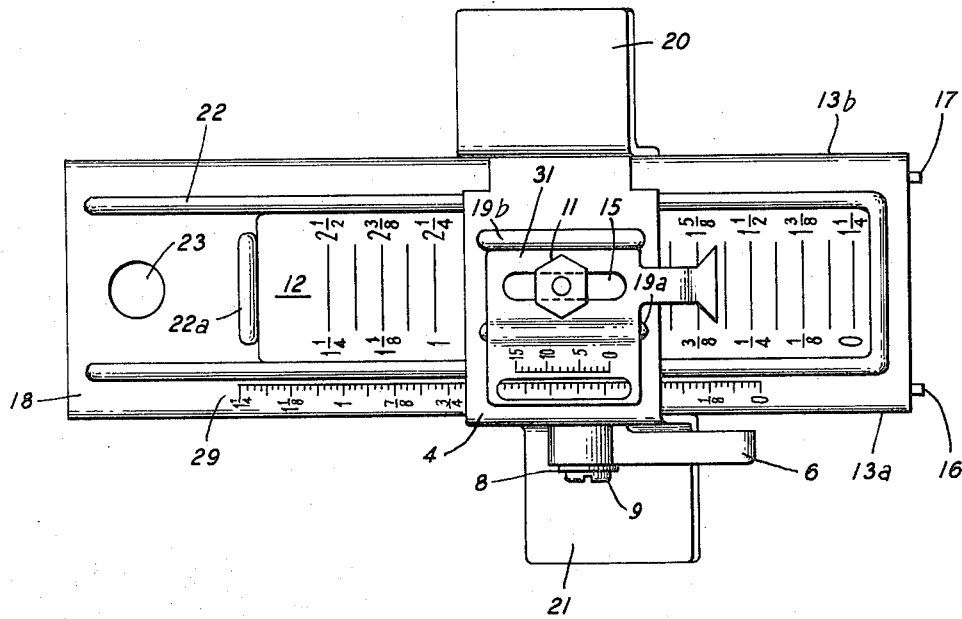
FIG. 3 is a view, similar to FIG. 2, that depicts the manner in which a vernier can be integrated into my gauge for precision measurements.

In FIG. 3, there is shown an alternative arrangement in which a vernier is included. The vernier may be desireable for applications demanding greater accuracy. Since the working of a vernier is well known it is not discussed in detailed herein. However a feature to be noted in this arrangement is the fact that a change in indicating finger 5 is all that is required to add the vernier facility. Indicating finger 31, having an extended portion as shown in FIG. 3, is fastened in the same manner as previously discussed for finger 5. In addition it can be calibrated by movement along slot 15. An aperture in finger 5 permits viewing vernier scale 29 and alignment thereof with vernier scale (indicia) of finger 31.

I claim:

1. A gauge for measuring displacement comprising a base which forms a reference surface having substantially vertical side surfaces and an inclined surface said inclined surface having an inclination with respect to said reference surface, a gauge head seated upon said surface for sliding adjustments there along, a first contact surface integral with said head extending laterally beyond one of said vertical side surfaces of said base and substantially parallel to said reference surface and adapted to touch surfaces for measurement, a scale on said inclined surface, and an indicating finger on said gauge head adapted to indicate directly on said scale the displacement of said contact surface with respect to said reference surface continuously as said gauge head is slidably moved along said inclined surface.

2. The invention recited in claim 1 further including a second contact surface integral with said head being substantially parallel to said reference surface and extending laterally beyond said base opposite said first contact surface and vertically displaced therefrom, and said finger concurrently indicates the respective displacements of said first and second contact surfaces as said gauge head is slidably moved along said inclined surface.

3. The invention recited in claim 1 further including calibrating means for repositioning said finger with respect to said head so as to alter the indicated displacement of said first contact surface with respect to said reference surface within a prescribed range less than the total scale range of said direct reading scale.

4. The invention recited in claim 1 wherein said inclined surface includes a guide surface protruding laterally with respect to one of said side surfaces, said guide surface having an upper and lower surface and further including a locking arrangement comprising a lever secured via a common shaft to an eccentric cam, said lever and cam being mounted on said gauge head and positioned so as to contact said guide surface by turning said lever and shaft to make a frictional contact between said cam and said undersurface of said guide surface.

5. The invention set forth in claim 1 further including means for more precisely locating said contact surface with respect to said reference surface comprising first vernier indicating indicia combined with said finger situated on said gauge head, and correspondingly aligned second vernier indicating indicia on said inclined surface viewable through an aperture in said finger.

6. A gauge for measuring vertical displacement of a tool surface from a reference surface comprising a base which forms the reference surface, an inclined surface having an inclination with respect to said reference surface and side surfaces contiguous with said base and inclined surface, a gauge head seated upon said inclined surface for sliding adjustments there along, said inclined surface extending beyond said side surfaces and the extended portions thereof forming left and right side protruding guide members, said gauge head having downward and inwardly extending curved fingers in registry with said guide members for restricting movement of said gauge head to sliding movement up and down said inclined surface, said gauge including a contact member extending laterally beyond one of said side surfaces and substantially parallel to said reference surface adapted to come into contact with said tool surfaces to be measured, a height indicating indicia on said inclined surface, an indicating finger adjustably affixed to said gauge head and situated so as to continuously indicate vertical displacement of said contact member with respect to said reference surface as said gauge head and contact member are slidably moved along said inclined surface, and means for adjusting said finger with respect to said indicating indicia so as to directly indicate the displacement of said contact member with respect to said reference surface.

7. The gauge recited in claim 6 further including another contact member extending laterally beyond said base oppositely situated from and vertically displaced from the aforementioned contact member, and a separate scale in said indicating indicia to indicate the vertical displacement of said another contact member from the reference surface, and wherein said finger concurrently indicates the displacement of both contact members from the reference surface as said gauge is slidably moved along said inclined surface.

* * * * *